(12) United States Patent
Rodgers

(10) Patent No.: US 8,988,222 B2
(45) Date of Patent: Mar. 24, 2015

(54) STOLEN BICYCLE (MISSING CHATTEL) IDENTIFICATION, TRACKING AND LOCATION; A SYSTEM AND METHOD

(76) Inventor: James Neil Rodgers, Langley (CA)

(*) Notice: Subject to any disclaimer, the term of this patent is extended or adjusted under 35 U.S.C. 154(b) by 1831 days.

(21) Appl. No.: 11/624,215

(22) Filed: Jan. 18, 2007

(65) Prior Publication Data

US 2008/0174431 A1    Jul. 24, 2008

(51) Int. Cl.
*B60R 25/00* (2013.01)
*B60R 25/102* (2013.01)

(52) U.S. Cl.
CPC ............. *B60R 25/102* (2013.01); *B60R 25/001* (2013.01); *B60R 2325/205* (2013.01); *B60R 2325/306* (2013.01)
USPC ....................... 340/572.1; 340/426.2; 340/427

(58) Field of Classification Search
CPC ................... B60R 2325/205; B60R 2325/306; B60R 25/102
See application file for complete search history.

(56) References Cited

U.S. PATENT DOCUMENTS

| | | | | |
|---|---|---|---|---|
| 4,030,102 | A * | 6/1977 | Kaplan et al. | 343/915 |
| 5,857,762 | A * | 1/1999 | Schwaller | 362/473 |
| 5,955,965 | A * | 9/1999 | Calandruccio | 340/825.49 |
| 5,999,091 | A * | 12/1999 | Wortham | 340/431 |
| 6,559,564 | B1 * | 5/2003 | Itou | 310/67 A |
| 6,783,141 | B1 | 8/2004 | Backhaus | |
| 6,883,710 | B2 * | 4/2005 | Chung | 235/385 |
| 6,967,577 | B2 * | 11/2005 | Taylor et al. | 340/572.1 |
| 6,987,327 | B1 * | 1/2006 | Lucatero | 290/1 A |
| 7,045,910 | B2 | 5/2006 | Kitamura | |
| 7,046,987 | B2 | 5/2006 | Siegel | |
| 2004/0198381 | A1 * | 10/2004 | Siegel et al. | 455/456.1 |
| 2005/0088280 | A1 * | 4/2005 | Beehler et al. | 340/5.62 |
| 2005/0228268 | A1 * | 10/2005 | Cole | 600/420 |
| 2007/0018832 | A1 * | 1/2007 | Beigel et al. | 340/572.7 |

OTHER PUBLICATIONS

U.S. Appl. No. 07/755,693, filed Sep. 6, 1991, Pietras.
U.S. Appl. No. 09/249,228, filed Feb. 11, 1999, Theofanous.
Collins, Jonathan, Avery Designs Passive UHF Tag for Metal, RFID Journal, Mar. 9, 2005, RFID Journal, Inc. U.S.A., http://www.rfidjournal.com/article/articleprint/1436/-1/1/.
Elamin, Ahmed, RFID tags turns metal packaging into antennas, Food Production Daily.com, Dec. 6, 2006, http://www.foodproductiondaily.com/news/printNewsBis.asp?id=72561.

* cited by examiner

*Primary Examiner* — Firmin Backer
*Assistant Examiner* — Nay Tun

(57) ABSTRACT

A system and method for identifying, tracking and locating stolen bicycles (missing chattels) in an urban area from a plurality of stations. A passive RFID memory based transponder is manufactured into the hollow metal frame of a bicycle (missing chattel) during manufacture. The passive memory based transponder is engaged and powered up by a tag initiation process which emanates from a cellular telephone tower using microwave frequencies. This process is initiated upon a report of the bicycle (missing chattel) being stolen. It is then powered from an internal generator driven by the rotation of the axle of the bicycle, or similar conveyance, with chargeable battery assist. Missing chattel is defined herein as a bicycle, motorcycle, car, truck, bus, tractor trailer or other similar conveyance.

9 Claims, 5 Drawing Sheets

STOLEN BICYCLE (MISSING CHATTEL) IDENTIFICATION, TRACKING AND LOCATION; A SYSTEM AND METHOD

DESCRIPTION

This invention relates to a system and method for identifying, tracking and locating stolen bicycles, (missing chattels,) in an urban area. The system utilizes a passive Gen 2 RFID memory transponder, for example those manufactured by Avery Dennison or the Crown/QinetiQ strategic partnership, manufactured directly into the hollow frame of a bicycle, motorcycle or chassis of a car, bus or truck or tractor trailer; or similar conveyance. The invention proposes utilizing triangulation algorithms garnered from radio transmission information beamed by cellular telephone towers, radio transmissions, or satellite communications methodologies and a response from the memory transponder in the missing chattel to identify and locate the stolen bicycle, motorcycle, or motor vehicle, truck, or tractor trailer. The passive transponder would become active upon a triggering event, for example the report of the chattel being missing, through radio transmission communication or via misuse of the internal numbered combination triggering mechanism. The power for the active transponder could be generated by electricity manufactured from the rotation of the axle on the axle hub of the missing chattel obviating the need for stored battery power but supplying current to a rechargeable battery device. Alternatively, power could come from the internal battery source of a car, truck, or bus.

BACKGROUND OF THE ART

Bicycle, motorcycle, car, bus and truck or trailer (herein and throughout this document defined as "missing chattels"; unless otherwise noted) anti-theft devices are well known in the art. In spite of all of these physical devices, such as wheel, frame, steering column locks, and electronic devices, such as fob ignition kills, bicycle theft, in particular, is rampant. While many types of theft have declined in recent years, bicycle theft is on the rise according to FBI statistics. The increasing popularity of bicycling as a sport and a means of transportation has made bicycles an easy target for thieves. It is estimated that 1.5 million bicycles are stolen every year in the United States of America. Nowhere is bicycle theft a bigger problem than on college campuses. It is estimated that over half of the property crime at the University of California involves the theft of bicycles. Furthermore, the costs of anti-theft devices are at times prohibitive. As an example, audible alarms can cost $150-$1,000. Steering column collars which prevent thieves from "hot-wiring" a conveyance have price points of $100-$200, installed. Tire locks range between the prices of $80-$200.

SUMMARY OF THE INVENTION

A passive memory based transponder costs less than $0.50. The size of these transponders is less than the dimensions of a dime. Transponders can easily be manufactured into the inside hollow frame of a bicycle during the manufacturing process. The passive memory transponder includes a memory function contained in an integrated circuit chip embedded into the said transponder. There is also an antenna attachment. The spokes of a bicycle, manufactured of aluminum, are a naturally designed parabola, perfectly designed for radio energy reception or transmission. This allows the transponder to receive and transmit radio information and to store data written onto the read/write memory function of the embedded chip. The built in antenna of cars, trucks and motorcycles can be used for the same purpose.

When a bicycle, motorcycle, car, truck, bus, trailer or other similar conveyance is stolen, it is typical for the owner to make a report to local police. This invention encourages the police to then contact the local cellular telephone network which operates a series of "cells" or transmission towers laid out in a square grid designed to blanket an entire urban area with microwave radio signals. The signals are for the purpose of wireless mobile telephone services. According to this invention, when the police are notified of a stolen conveyance, the local cellular telephone network sends out a microwave radio signal which transmits the identification number of the stolen conveyance. This identification number is written onto the memory of the integrated circuit chip contained in the passive memory transponder. The integrated circuit chip embedded in the passive memory transponder is manufactured into the hollow frame of the bicycle, motorcycle, car, truck, bus, or trailer and is attached via wire to the spoke antenna or built in radio antenna.

For example, an identification number or serial number which is programmed into the integrated circuit is programmed to resonate when contacted at a specific microwave radio frequency. When so contacted by a microwave signal from the local cellular telephone network, or similar communication network, the passive transponder is stimulated into excitation, a type of waking up procedure or protocol, and immediately shifts to a waking or active phase. Alternatively, the waking up procedure or protocol may be stimulated into excitation by misuse of the combination number device manufactured into the handle bars of the bicycle or, in some other convenient location, of the missing chattel.

The problem with the aforementioned scenario is that the active phase requires a power source. There is no readily available power source on a bicycle. Adding a stored energy battery pack is unfeasible as it would not fit into the hollow frame of the bicycle or could run dry. Furthermore, an externally mounted battery source would be easily disconnected by a would be thief.

In anticipation of this problem, this invention proposes that a small magnetic-electric generating device be manufactured into the inside hollow frame of the bicycle and attached by wire to the rotating portion of the axle of the bicycle, or other conveyance. In this manner the rotating axle will generate sufficient magnetic-electric energy to the now active transponder which enables it to broadcast a strong radio signal back to the cellular telephone network transmission towers. This signal indicates to the cellular telephone transmission tower that the transponder manufactured into the hollow frame of the bicycle is now active and awake. When the battery is fully charged by the magnetic-electric energy generated from the rotating axle, the human perceivable alarm will be activated. The human perceivable alarm is triggered when a would be thief is unable to enter the correct combination in the numerical combination device mounted on the handle bars of the bicycle or on a convenient location on another type of missing chattel. The alarm sounds when the battery is sufficiently charged.

There is placed at the cellular telephone network towers a device containing triangulation algorithms which calculate the location of the missing bicycle, or other missing chattel, by measuring the distance the active signal is from at least three transmission towers, as a function of time.

For example, the data from at least three cellular transmission towers, which have received a transmission from the now active transponder, is sent to a centralized processor. This processor is a device which performs a triangulation function to determine the location of the bicycle, or other missing chattel. The triangulation is accomplished through use of an algorithm which recovers and separates multiple co-channel signals very rapidly through the use of array signals. The algorithm can provide direction-of-arrival (DOA) parameters for each signal source as the antenna array calibration data is available. The signal separation routine cooperates with the antenna array to provide steering vectors that are used in separation and direction finding for a desired signal. An antenna array can be steered to transmit and receive signals to or from a desired direction. A signal estimation locater can reside at a master control unit or at a master receiver station. The master signal estimation locator receives signal data from one or more receivers, and determines an estimated location in the cellular transmission network area by using the received signal data and geographical position information of the receiver towers which are located throughout the cellular transmission area. By using this data at a centralized computer processor, the estimated location of the stolen bicycle can be accomplished through a variety of triangulation of trilateration techniques. This process can be repeated to refine the estimates of location.

The invention is dependent upon the co-operation of a local cellular telephone network or satellite communication network. There is a requirement for said local cellular telephone network or satellite communication network to purchase, install, maintain, and operate the computer hardware and software required to properly operate the tracking, identification and location system as disclosed herein. Furthermore, the manufacturer of the missing chattel will need to co-operate and absorb the cost of purchase and installation of the magnetic electric generating device and the rechargeable battery pack plus ancillaries, such as wiring.

BRIEF DESCRIPTION OF THE DRAWING

The detailed description of the preferred embodiments of the present invention will be more easily and better understood when read in conjunction with the FIGURES of the Drawing which include.

DESCRIPTION OF THE PREFERRED EMBODIMENT

Figure 1:
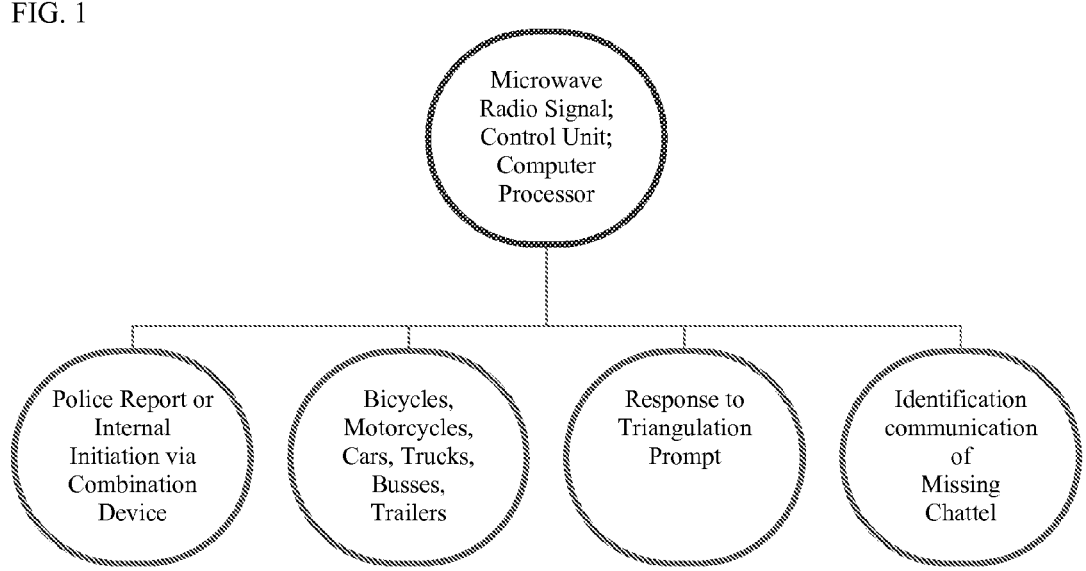
FIG. 1 is a schematic flow diagram illustrating an example embodiment of this system in accordance with the invention disclosed herein.

A system according to the invention is useful for locating a missing chattel at a plurality of stations. A passive memory transponder is associated with each missing chattel to be identified and located by the process of being manufactured directly into the frame of the missing chattel. The passive memory transponder includes at least an electronic integrated circuit memory coupled to an antenna by which information from the memory of the integrated circuit may be transmitted and/or information may be received and stored in the memory of the transponder. Control units for the memory transponders, such as readers and writers, with the aid of antenna arrays located at the cellular transmission tower stations, communicate with the memory transponders and send information to processors located at the stations, or centrally. This process is used for monitoring and controlling the stations and/or control units including one or more stations. FIG. 1 is a schematic flow diagram illustrating an example embodiment of an identification, tracking and location system in accordance with the invention. This example system includes a passive memory transponder being excited by a microwave radio signal from a local cellular telephone transmission tower. Each local cellular telephone transmission tower contains a control unit which communicates with the passive memory transponder. This communication is initiated by police or by an owner through his local cellular telephone provider upon noticing that a bicycle has been stolen or through internal stimulation through misuse of the number combination device. Examples of missing chattels include, but are not limited to, bicycles, motorcycles, automobiles, trucks and busses. Each station includes a control unit for communicating with the passive memory transponder when it is within the detection region of the control unit and its associated antenna array. Each antenna array includes a plurality of antenna, typically loop antenna, arranged so that the passive memory transponder within the detection region will be detected with substantially 100% reliability.

The control units are coupled for direct or indirect communication with a computer or processor for processing of triangulation data. Communication between control units and one or more computers may be by any convenient communication apparatus, such as by wires and cables, radio or RF transmission, local area network, wide area network, optical fiber, and the like, or combinations thereof.

Any convenient communication protocol, for example RS-485 or RS-232 may be utilized. The location, proximity and geography of the various elements will determine whether the chosen communication is wired and/or wireless or cable, optical fiber or optical communication. Communication may occur periodically, but promptly. Suitable communication devices are available commercially from several sources and provide direct communication or communication via relay links. These devices are suitable for communication between computer over local area and wide area networks.

Figure 2:
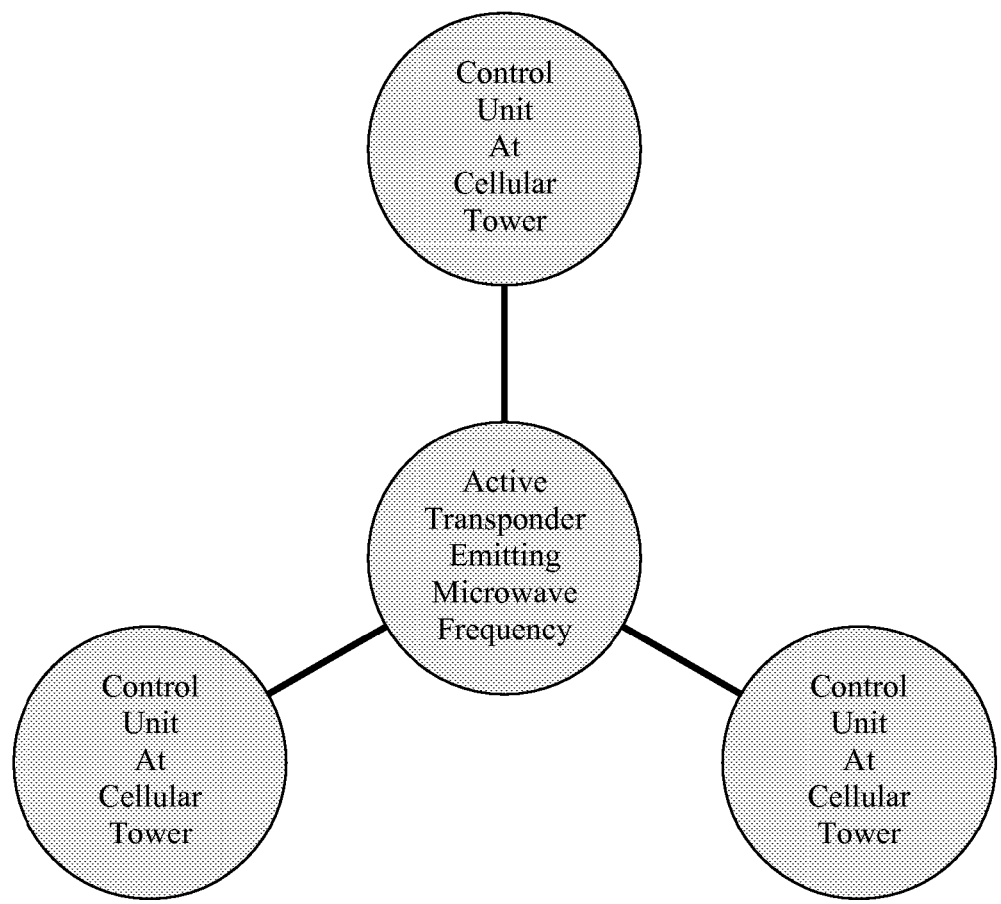
FIG. 2 is a schematic block diagram illustrating an example of one or more cellular network telephone stations and/or operations including the present invention operating in triangulation mode.

FIG. 2 is a schematic block diagram which illustrates an example of one or more control units located at cellular telephone towers utilizing the present invention to triangulate through commercial algorithms a position of a passive memory transponder which has been excited into active state and is being powered by its internal generator or chargeable energy battery pack.

Figure 3:
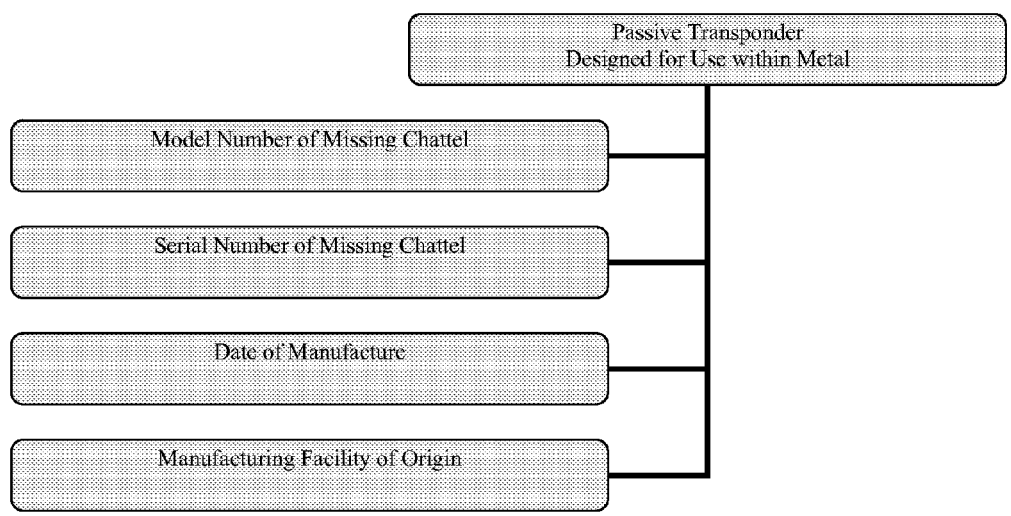
FIG. 3 is an organizational chart outlining an example of items to be placed on the integrated circuit memory of the passive memory transponder.

FIG. 3 is a flow chart describing an example, according to the invention, whereby a passive memory transponder has encoded in its memory an identifying piece of information such as model number, serial number, date, manufacturer, plant or facility and information of the same kind.

Figure 4:
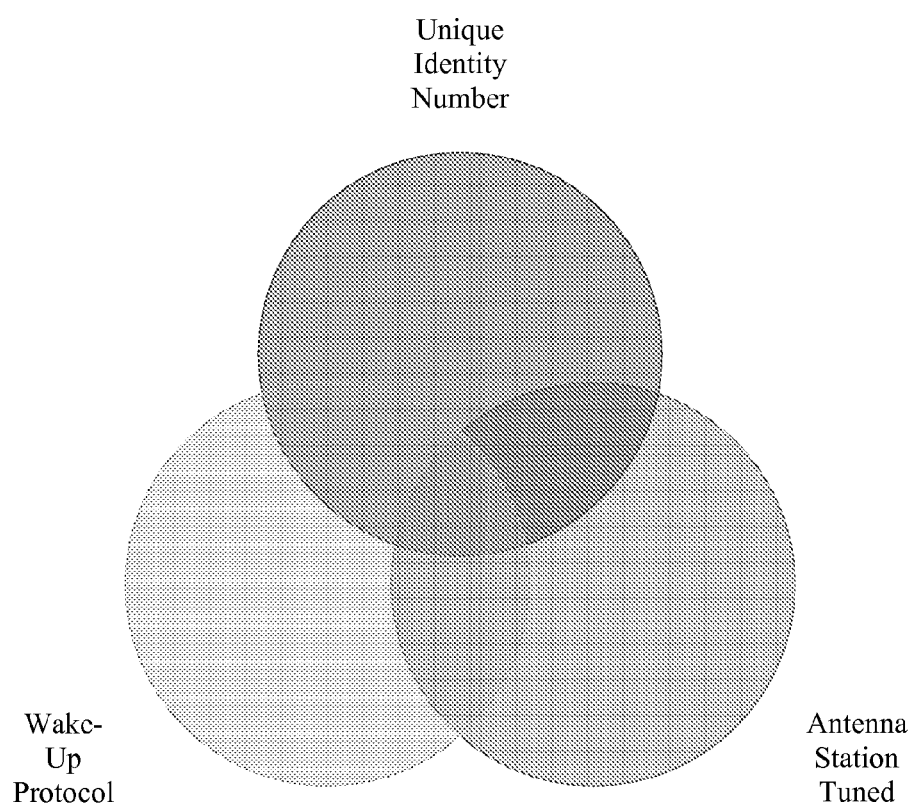
FIG. 4 is an organizational chart representing the type and function of memory allocations required on the passive integrated circuit.

FIG. 4 is a schematic representation of a memory allocation suitable for a passive memory transponder to be used pursuant to this invention. It is anticipated that EEPROM memory will be utilized for storage of particular information, such as a unique identity number assigned by the manufacturer to a potential missing chattel. The memory is usually segmented into two parts by the manufacturer: the first is the section where the unique identifier is burned in which may be hundreds of bits in length; the second is for storing data which may be modified, written over or otherwise changed in the use of the electronic device. The third section would include, among other things, the wake up protocol and active transmission protocol of a radio frequency to the inquiring control stations.

The antenna of the transponder is tuned so that RF energy, including electromagnetic fields and electrical signals, can stimulate the transponder to emit a signal representative of the information, being the unique identifier stored in the chip memory. This type of contract-less structure eliminates the need for an electrical contact or a line of sight path in order for communication to occur between the control station and the chip.

In a preferred embodiment a relational database would store the identifier data in a processor facilitating fast action by the police.

Figure 5:
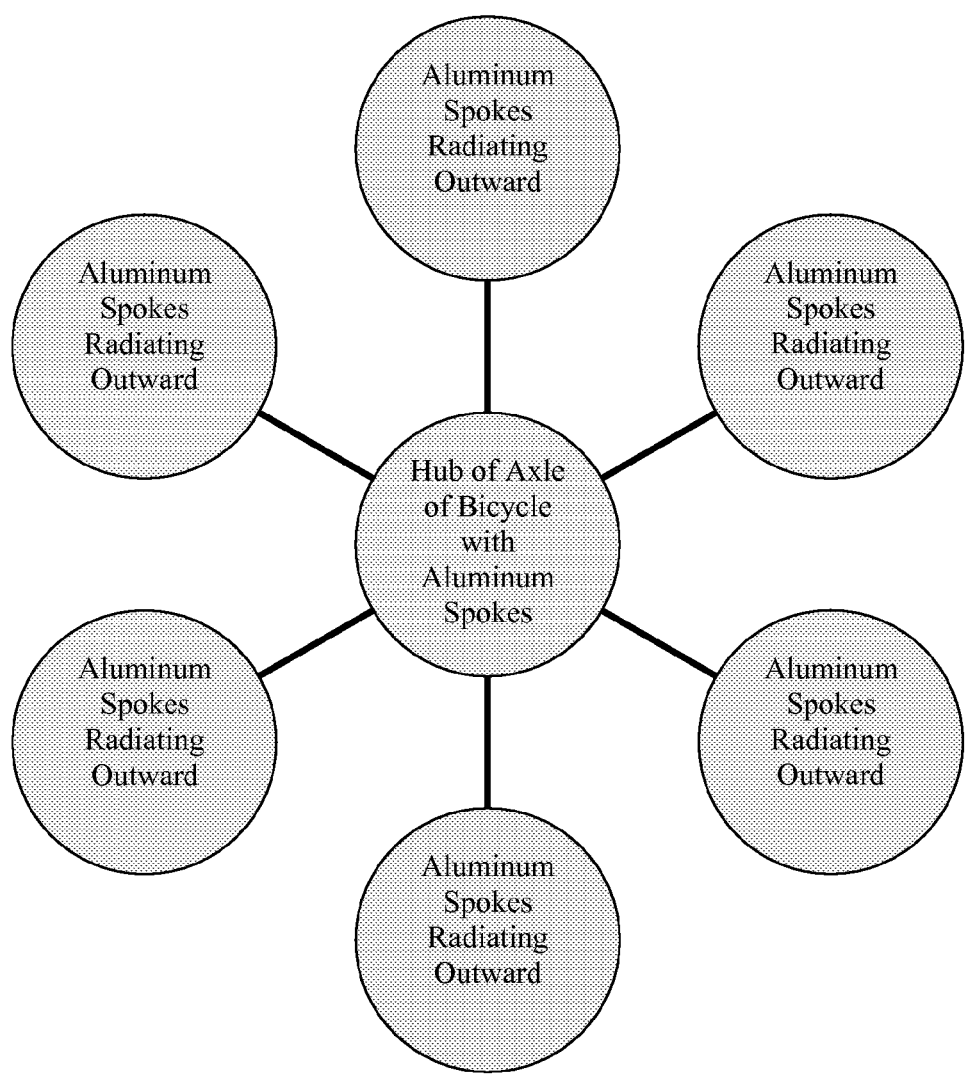
FIG. 5 is a schematic diagram of a type of antenna array suitable for use with this invention.

FIG. 5 is a schematic diagram of one example of an antenna array suitable for use with the invention. Pursuant to this invention it is intended that each antenna array comprises a plurality of antenna disposed or arrayed in respective orientations so as to produce, when transmitting, an electromagnetic field in the detection region having components in each of three orthogonal directions.

What is claimed is:

1. A system of activating a passive radio frequency identification integrated circuit (RFID) transponder which is attached to a frame of a missing chattel by converting the passive RFID transponder into an active RFID transponder following an activation event upon which the active RFID transponder is powered by an electromagnetic charge generated by the rotation of the wheels of the missing chattel; said system comprising: a missing chattel with attached memory based said passive RFID transponder capable of receiving and transmitting microwave frequency information bearing electrical signals; said memory of said RFID transponder containing identifying information with respect to said missing chattel and further said RFID transponder including sufficient memory and an antenna coupled to the memory for transmitting and/or receiving information bearing signals in a memory based transponder smart format;

microwave frequency communication transmit and receive means comprising one or more of a cellular telephone network or a satellite based communication network using radio or RF transmission and the Internet, or a combination thereof;

a plurality of memory based transponder readers located in and linked to the cellular telephone network or linked to the satellite based communication network using radio or RF transmission and the internet, or a combination thereof, and enabled to transmit information to and receive information from said microwave frequency RFID transponder attached to said missing chattel;

transponder activation by said microwave frequency communication transmit and receive means activating said antenna and provoking a waking up phase for said passive RFID transponder to enable microwave frequency transmit and receive operations;

transponder power source separate from both the microwave frequency transponder activation and combination device activating means thereby transforming the passive transponder into an active transponder to indicate unauthorized use and the location of the missing chattel; said power source being electromagnetic charges generated by the rotation of the wheels of the missing chattel;

a chargeable battery pack chargeable by the power source; said battery pack attached to said missing chattel and said battery pack for the purpose of providing continuing transmission of microwave frequency identifying signals; computer processor for processing missing chattel identification and location information from said communication means.

2. The system of claim 1 wherein the memory based passive RFID transponder is securely and permanently attached to an internal hollow frame of the missing chattel, or otherwise attached by hidden means to the missing chattel; wherein the missing chattel comprises a bicycle, motorcycle, automobile chassis or tractor trailers.

3. The system of claim 1 of locating said missing chattel with said passive RFID transponder embedded into an hollow frame of said missing chattel or otherwise attached by hidden means to the missing chattel whereby a microwave signal is transmitted by an urban cellular telephone network/station, or a satellite based communication network using radio or RF transmissions and the Internet, or a combination thereof which initiates the passive RFID transponder by exciting the antenna and provoking a waking up phase for the passive RFID transponder.

4. The system of claim 1 whereby further the passive RFID transponder is transformed into an active RFID transponder through the power source separate and distinct from both the microwave frequency transponder activation and the combination activation means and whereby said power source derives from the wheel/axle rotation of the missing chattel, through the use of an electrical generator connected via wire to the axle of the rotating wheel of the missing chattel; wherein the missing chattel comprises a bicycle, motorcycle, automobile or tractor trailers.

5. The system of claim 4 whereby still further with respect to the power source of the missing chattel, a wheel hub and an hub shell generate electricity via the rotation of a hub tube relative to a hub axle.

6. The system of claim 5 whereby the power source further comprises an inside stator retained to the hub axle and an outside rotor that rotates in response to rotation of the hub tube.

7. The system of claim 1 whereby further the RFID transponder, upon the transponder activation and awakening, by cell phone tower microwave frequency electric signal, then sends an RF signal via microwave communication to the nearest cellular telephone tower/station indicating that the transponder has been awakened and providing the specific data identifying itself via number assignment.

8. The system of claim 1 whereby the power source includes the chargeable battery pack fitted into the hollow frame or elsewhere or otherwise attached by hidden means to the missing chattel and whereby the power source further includes an output direct current which is operatively connected to an inverter, said inverter converting a direct voltage and current into an alternating voltage and current that is in parallel electrical connection with respect to the input of the chargeable storage battery pack via a wired electrical connection proceeding through the hollow tubular frame which supports the missing chattel wheel axle, either front or back.

9. A system of activating a passive radio frequency identification integrated circuit (RFID) transponder which is attached to a frame of a chattel by converting the passive RFID transponder into an active RFID transponder upon an activation event upon which the RFID transponder is powered by an electromagnetic charge generated by the rotation of the wheels of the chattel; said system comprising:

a missing chattel with attached memory based said passive RFID transponder capable of receiving and transmitting microwave frequency information bearing electrical signals; said memory of said RFID transponder containing identifying information with respect to said missing chattel and further said RFID transponder including sufficient memory and an antenna coupled to the memory for transmitting and/or receiving information bearing signals in a memory based transponder smart format;

microwave frequency communication transmit and receive means comprising one or more of a cellular telephone network or a satellite based communication network using radio or RF transmission and the Internet, or a combination thereof;

a plurality of memory based transponder readers located in and linked to the cellular telephone network or linked to the satellite based communication network using radio or RF transmission and the internet, or a combination thereof, and enabled to transmit information to and receive information from said microwave frequency RFID transponder attached to said missing chattel;

transponder activation by said microwave frequency communication transmit and receive means activating said antenna and provoking a waking up phase for said passive RFID transponder to enable microwave frequency transmit and receive operations;

transponder power source separate from both the microwave frequency transponder activation and combination device activating means thereby transforming the passive transponder into an active transponder to indicate unauthorized use and the location of the missing chattel; said power source being electromagnetic charges generated by the rotation of the wheels of the missing chattel;

a chargeable battery pack chargeable by the power source; said battery pack attached to said missing chattel and said battery pack for the purpose of providing continuing transmission of microwave frequency identifying signals; computer processor for processing missing chattel identification and location information from said communication means; and wherein the missing chattel comprises a bicycle, motorcycle, car, bus, truck or tractor trailer.

* * * * *